(12) United States Patent
Moretti

(10) Patent No.: US 8,167,171 B2
(45) Date of Patent: May 1, 2012

(54) DEVICE FOR DISPENSING, BY MEANS OF A PUMP, FLUID SUBSTANCES CONTAINED UNDER AIRTIGHT CONDITIONS IN A DEFORMABLE BAG HOUSED IN A RIGID CONTAINER

(75) Inventor: Matteo Moretti, Crema (IT)

(73) Assignee: Lumson S.p.A., Capergnanica (CR) (IT)

( * ) Notice: Subject to any disclaimer, the term of this patent is extended or adjusted under 35 U.S.C. 154(b) by 407 days.

(21) Appl. No.: 12/515,094

(22) PCT Filed: Jun. 10, 2008

(86) PCT No.: PCT/EP2008/057237
§ 371 (c)(1),
(2), (4) Date: May 15, 2009

(87) PCT Pub. No.: WO2009/047021
PCT Pub. Date: Apr. 16, 2009

(65) Prior Publication Data
US 2010/0044393 A1 Feb. 25, 2010

(30) Foreign Application Priority Data
Oct. 8, 2007 (IT) .............................. MI2007A1936

(51) Int. Cl.
*B65D 35/28* (2006.01)
(52) U.S. Cl. ......... 222/95; 222/96; 222/105; 222/321.7; 222/321.9

(58) Field of Classification Search ............... 222/105, 222/321.1, 321.7, 321.9, 92–96
See application file for complete search history.

(56) References Cited

U.S. PATENT DOCUMENTS

| 3,620,399 | A | * | 11/1971 | Rapeaud et al. | 215/12.1 |
|---|---|---|---|---|---|
| 4,892,230 | A | * | 1/1990 | Lynn, Jr. | 222/105 |
| 4,984,713 | A | * | 1/1991 | Chambers et al. | 222/105 |
| 5,749,460 | A | * | 5/1998 | Rice | 220/23.83 |
| 6,238,201 | B1 | * | 5/2001 | Safian | 425/527 |
| 2004/0112921 | A1 | | 6/2004 | Nomoto et al. | |
| 2005/0067432 | A1 | * | 3/2005 | Bonneyrat | 222/105 |

FOREIGN PATENT DOCUMENTS
JP  2008 114859  5/2008

OTHER PUBLICATIONS
U.S. Appl. No. 12/753,595, filed Apr. 2, 2010, Moretti.
U.S. Appl. No. 12/762,700, filed Apr. 19, 2010, Moretti.

* cited by examiner

*Primary Examiner* — Jason Boeckmann
(74) *Attorney, Agent, or Firm* — Oblon, Spivak, McClelland, Maier & Neustadt, L.L.P.

(57) ABSTRACT

A device for dispensing, by a manually operable pump, fluid substances contained in a deformable bag housed in a rigid container. The bag includes a mouth with a projecting flange with which the pump engages in coupling to the flange, and which causes the bag to be extracted from the container when the pump is separated from the container after the bag has been emptied.

3 Claims, 4 Drawing Sheets

DEVICE FOR DISPENSING, BY MEANS OF A PUMP, FLUID SUBSTANCES CONTAINED UNDER AIRTIGHT CONDITIONS IN A DEFORMABLE BAG HOUSED IN A RIGID CONTAINER

CROSS-REFERENCE TO RELATED APPLICATIONS

This application is based upon and claims priority under 35 U.S.C. §371 from International Patent Application No. PCT/EP08/57237, filed Jun. 10, 2008 which claims priority under 35 U.S.C. §119 from Italian Patent Application No. MI2007A 001936, filed Oct. 8, 2007.

BACKGROUND OF THE INVENTION

1. Field of the Invention

The present invention relates to a device for dispensing, by means of a manually operable pump, fluid substances contained under airtight conditions in a deformable bag housed in a rigid container, and more particularly a device in which the bag has a mouth with a flange which extends beyond the neck of the container in which the bag is inserted, the pump having a ring cap for its removable mounting on the container neck and being provided with elements which couple to the bag flange to cause the bag to be extracted from the container when the pump is uncoupled and removed from the container when all the substance initially introduced into the bag has been dispensed.

2. Description of the Related Art

It is known to enclose fluid substances (both liquid and creamy) in containers from which these substances are dispensed by manually operating a small pump mounted on the mouth of a respective container. Pump operation causes a quantity of fluid substance to be withdrawn from the container in which—if the container is rigid—a vacuum forms which would prevent further substance withdrawal and dispensing if air were not allowed to enter the container (which generally takes place in those regions in which the pump makes contact with and slides on the pump body), or if the container did not comprise a base sealedly movable along an internal cylindrical surface of the container (see for example U.S. Pat. No. 4,691,847, U.S. Pat. No. 4,694,977 and U.S. Pat. No. 5,971,224): this latter system for compensating the container internal volume by reducing its internal volume while maintaining the internal pressure constant is however very laborious and costly.

In many cases it is opportune or necessary that the fluid substance to be dispensed by a pump never comes into contact with the atmosphere inside the container (with the dispensing pump mounted on it): sealing the fluid out of contact with the atmosphere is important if the composition of the fluid within the container is not to undergo alteration, or if it is essential that the fluid substance enclosed in the container remains sterile. To achieve this, U.S. Pat. No. 3,420,413 proposes a device comprising a bag containing a fluid substance which has to remain isolated from the atmosphere within the bag which (see column 4, lines 22-28) is made of an elastically deformable flexible material and has a neck on which a support element (having a profiled aperture for housing a pump) is sealedly applied after the bag has been filled with the fluid substance to be dispensed: after this, a pump is sealedly mounted on said support element to hence prevent contamination of the fluid substance by the air (column 5, lines 15-38). The bag containing the fluid substance and having the pump sealedly mounted on its neck is then inserted into a rigid container (obviously being very careful that the free end of the rigid container does not come into contact with the bag filled with fluid substance, in order not to break it) on which said support element is then positioned and fixed (column 5, lines 56-61). Hence between the outer surface of the bag and the inner surface of the rigid container an interspace is formed which is connected to atmosphere via a hole provided in the container base; in this manner, when the fluid substance is withdrawn from the bag by operating the pump, the bag is squeezed by the atmospheric pressure so that it can be easily withdrawn and expelled to the outside by the pump (column 5, lines 70-73). The main drawback of the aforesaid device is that the deformable bag must be filled with fluid substance before the bag is inserted into the respective rigid container and that the operation involved in inserting the bag into the container is very delicate because the bag can be easily torn while being inserted into the container interior.

JP 05 031790A and JP 05 031791A published on Sep. 2, 1993 describe how a bag of elastically deformable material can be produced directly within a rigid container. For this purpose an elongated preform (made of thermoplastic material and having an elongated hollow cylindrical body, open at one end where the preform presents a neck from which a flange radially projects) is inserted into a rigid container having a mouth from which a neck extends, on the free edge of which there rests the flange of the preform, which is heated and then inflated within the container, until a bag forms, the outer surface of which adheres (at least for a large part of its surface) to the inner surface of the container. The bag obtained in this manner also has a neck, at least an end portion of which presents outwardly projecting longitudinal ribs, with some radial ribs or projections projecting from that surface of the preform flange which faces the free edge of the neck of the container in which the bag is inserted: these ribs or projections define passages for the air which penetrates from the outside between the container and bag to enable this latter to flatten or inwardly deform during outward dispensing of the fluid substance through the pump, so preventing the formation inside the bag of a vacuum which would prevent dispensing of the fluid substance.

US 2004/0112921A1 published on Jun. 17, 2004 (in the name of the same applicant as the two aforestated Japanese patent applications) illustrates a device comprising a container and a deformable bag such as that of the two Japanese patent applications, and in which a manually operable pump is mounted by means of a ring cap having a thread which engages and screws onto a corresponding screw thread projecting from the surface of the container neck. The pump is maintained pressed by the ring cap (screwed onto the container neck) to seal against the flange projecting from the bag mouth, passages being provided enabling air to pass from the outside to the space between the bag and container to enable the bag to gradually shrink onto itself as the quantity of fluid substance dispensed by the pump increases. Devices totally similar (and hence not requiring further comment) to that of US2004/011292A1 are described in DE 770773 U1 and NL 1 021 710 C2.

In all these devices, when (on termination of fluid substance dispensing from the respective deformable bags) the ring cap retaining the pump on the neck of the deformable bag is unscrewed from the spiral rib of the neck of the respective container and the pump is removed, the deformable bag remains retained inside the container. This constitutes a problem because national laws regarding environmental protection require the deformable bag (made of thermoplastic material or the like) to be disposed of separately from the container (which can be of glass or other rigid material suitable for the purpose). In the known devices described in the aforestated prior patents, it is not however possible to easily extract the deformable bag from the containers, when fluid substance dispensing has terminated.

SUMMARY OF THE INVENTION

The main object of the present invention is therefore to provide a device of the stated type in which the respective deformable bag becomes and remains automatically coupled to the dispensing pump when the pump is disconnected from the container neck, to hence cause the bag to be extracted from the container at the same moment as that in which the pump is removed from the container.

As the device described herein is preferably usable to contain and dispense valuable products (such as perfumes, creams, deodorant substances, medical substances and the like) for which glass containers are used, it becomes very easy to separate the glass container from the plastic bag, to achieve optimal refuse sorting.

These and other objects are attained by a device comprising a rigid container having a neck defining an aperture providing access to the container cavity, a bag made of thermoplastic material housed in the container and itself having a neck from which there radially extends a flange which rests on the free edge of the container neck and defines a hole for providing access to the bag cavity and for housing the body of a manually operable pump for withdrawing the fluid substance from the bag and feeding it to the outside through the pump dispensing stem, the pump body being pressed to form a seal on said bag flange by a ring cap presenting elements for engaging corresponding elements provided on the container neck, passages being provided for air entry from the outside of the container into the space existing between the inner surface of the container and the outer surface of the bag housed therein, characterised in that at least a portion of said bag flange projects radially beyond the outer lateral surface of the container neck at least in proximity to the free edge of the neck, from the inner surface of said ring cap there extending at least one profiled element which is positioned beyond the free edge of said bag flange, to retain the flange when the device is in its use position and to rest on that surface of said flange facing the container, to interfere with said flange surface and cause the bag to be extracted from the container together with the pump when the ring cap is disconnected and removed from the container.

Preferably the profiled element projecting from the inner surface of said ring cap consists of at least one continuous annular rib or a succession of annular rib segments which define at least one recess or annular groove into which the free edge of the flange projecting from the bag neck is inserted and retained.

As an alternative variant the profiled element projecting from the inner surface of said ring cap consists of the inner end of at least one thread or rib engaging a corresponding thread or rib projecting from the container neck, this end of the ring cap thread being positioned between said flange and the rigid container, at least a peripheral portion of said flange being interrupted by at least one aperture to enable at least one thread projecting from the ring cap and engaging the corresponding thread projecting from the container neck to pass while mounting the ring cap on the container neck.

Advantageously said passages for air entry from the outside of the container into the space existing between the inner surface of the container and the outer surface of the bag housed therein consist of recesses provided in the outer surface of the bag neck and in the lower surface of the radial edge projecting therefrom, said recesses being bounded by longitudinal ribs projecting from the outer surface of the bag neck and respectively by radial ribs projecting from the surface of the bag flange.

BRIEF DESCRIPTION OF THE DRAWINGS

Two non-limiting embodiments of the invention are described hereinafter with reference to the accompanying drawings, in which.

DETAILED DESCRIPTION OF THE INVENTION

Figure 1:
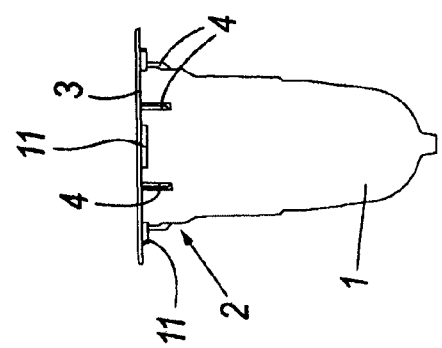
FIG. 1 is a side elevation of a hollow preform intended to form the bag for containing a fluid substance.

Reference will firstly be made to FIG. 1 which represents a side elevation of an internally hollow elongated preform (obtained by injection and blow moulding in a mould by methods well known in the art) made of thermoplastic material (such as polyethylene, pet, polypropylene) and having an elongated hollow cylindrical body 1 open at one end at which the perform presents a profiled neck 2 from which a flange 3 radially projects having a non-uniform thickness and a diameter greater than that of the outer surface of the neck 6 of the container 5, as can be seen clearly from all FIGS. 3-10 of the accompanying drawings. Spaced-apart teeth or thin longitudinal ribs 4 project from the outer surface of the neck 2 of the preform, as can be seen in particular from FIGS. 1, 2 and 8.

Figure 3:
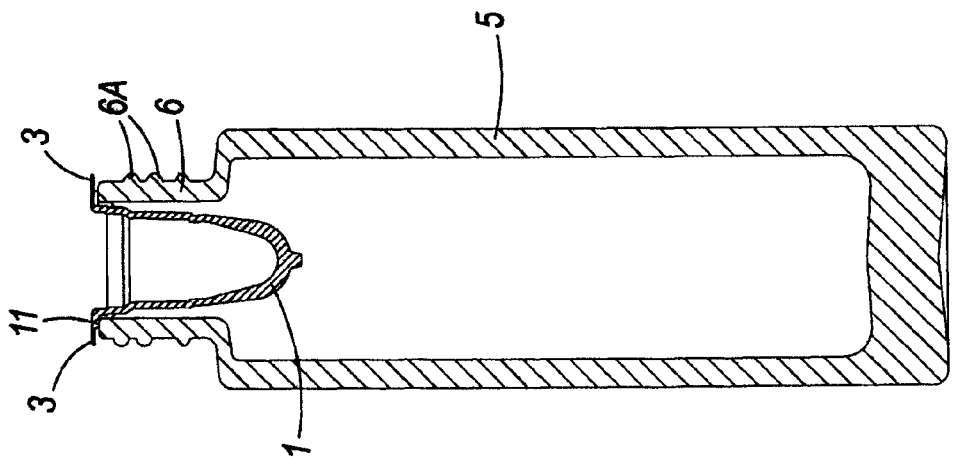
FIG. 3 is a longitudinal section through the perform of FIG. 1 freely inserted into a rigid container, also shown in section.
Figure 2:
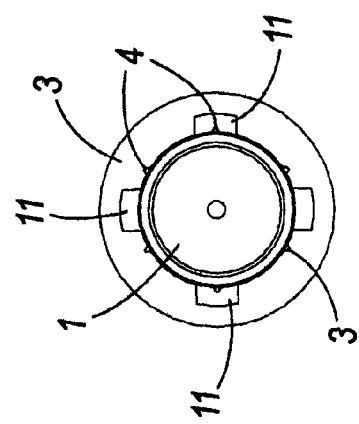
FIG. 2 is a view of the perform of FIG. 1, seen from below.
Figure 8:
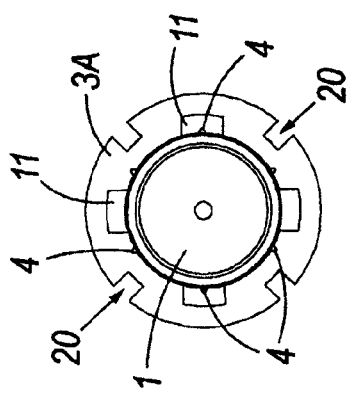
FIG. 8 is similar to FIG. 2, but shows a different embodiment of the hollow perform.

The transverse dimensions of the body 1 are such that it can be freely inserted into the rigid body 5 (advantageously made of glass), the neck 2 of the perform being of such a shape and dimensions as to be easily penetrable into the hole in the neck 6 of the body 5, with the free ends of the teeth 4 being in contact with the inner surface of the hole in the neck 6, while the projecting flange 3 of the preform rests on the end of said neck 6 but without sealedly adhering to it because spaced-apart radial ribs or projections 11 project from the lower surface (with respect to FIG. 1) of the flange 3 (see also FIGS. 2 and 8).

In this manner free passages 7 form between the flange 3 of the preform neck and the free edge of the container neck 6, while other free passages 8 form (between each tooth 4 and the tooth adjacent to it) between the outer surface of the preform neck 2 and the inner surface of the hole in the neck 6 of the rigid container 5 (FIGS. 3-10).

Figure 4:
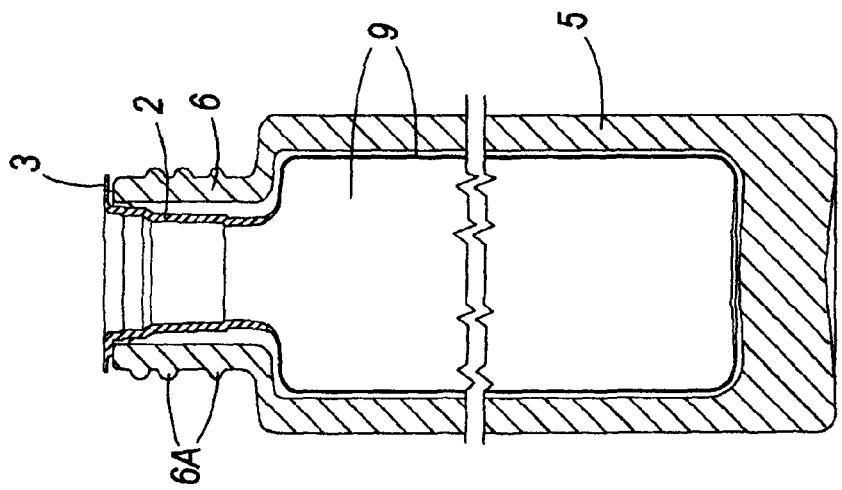
FIG. 4 is a partial representation of the container shown in section on an enlarged scale, after the bag inserted therein has been deformed by heating and inflation.

The hot preform is inserted into the container and air (or another gas or a liquid) is fed—as described in JP 05 031790A and JP 05 031791A the teachings of which are incorporated herein—into the preform, which is hence deformed to inflate as shown in FIG. 4 until it rests on the inner surface of the cavity of the rigid container 5 to form a widened bag indicated by the numeral 9 in Figures from 3 to 6. In this manner the preform and the container form a rigid body which can be easily transported (without danger of undergoing damage) from its place of production to that of its utilization: the thickness of the wall of the bag 9 can be for example about 0.1-0.4 mm.

Figure 5:
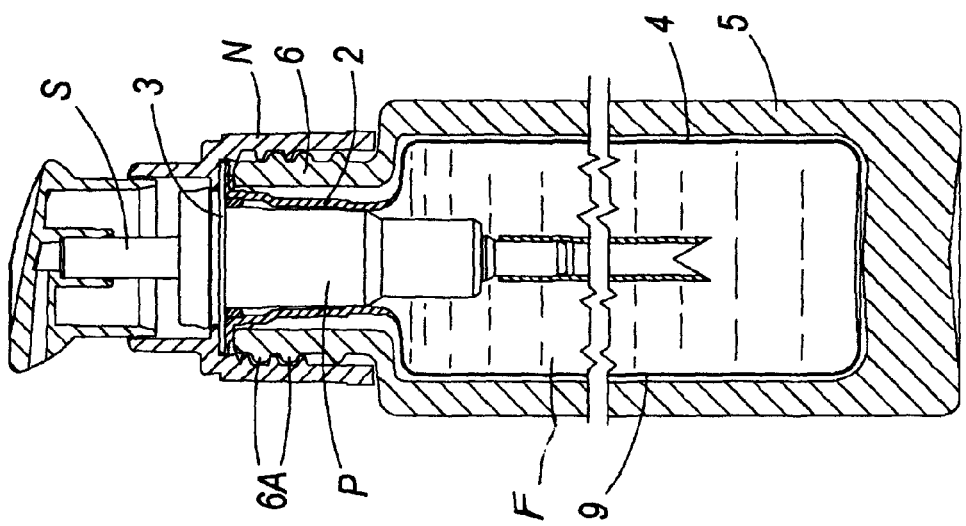
FIG. 5 is a partial longitudinal section through the device, complete with dispensing pump and with the fluid substance sealedly enclosed therein, shown prior to commencement of fluid substance dispensing.
Figure 7:
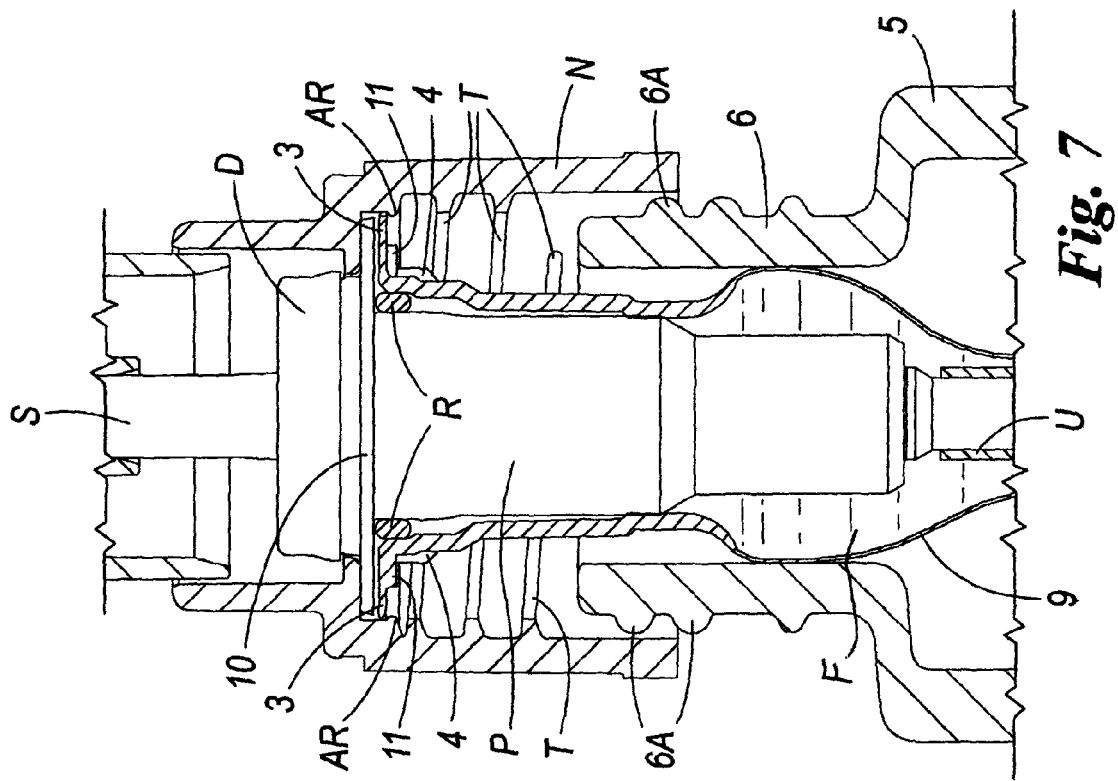
FIG. 7 shows, on an enlarged scale, the end of the device of FIG. 5 after the fluid substance has been dispensed from the bag, which assumes a narrow inwardly squashed form, the pump being shown removed from the rigid container and partially extracted from it, with the bag remaining coupled to the pump.
Figure 10:
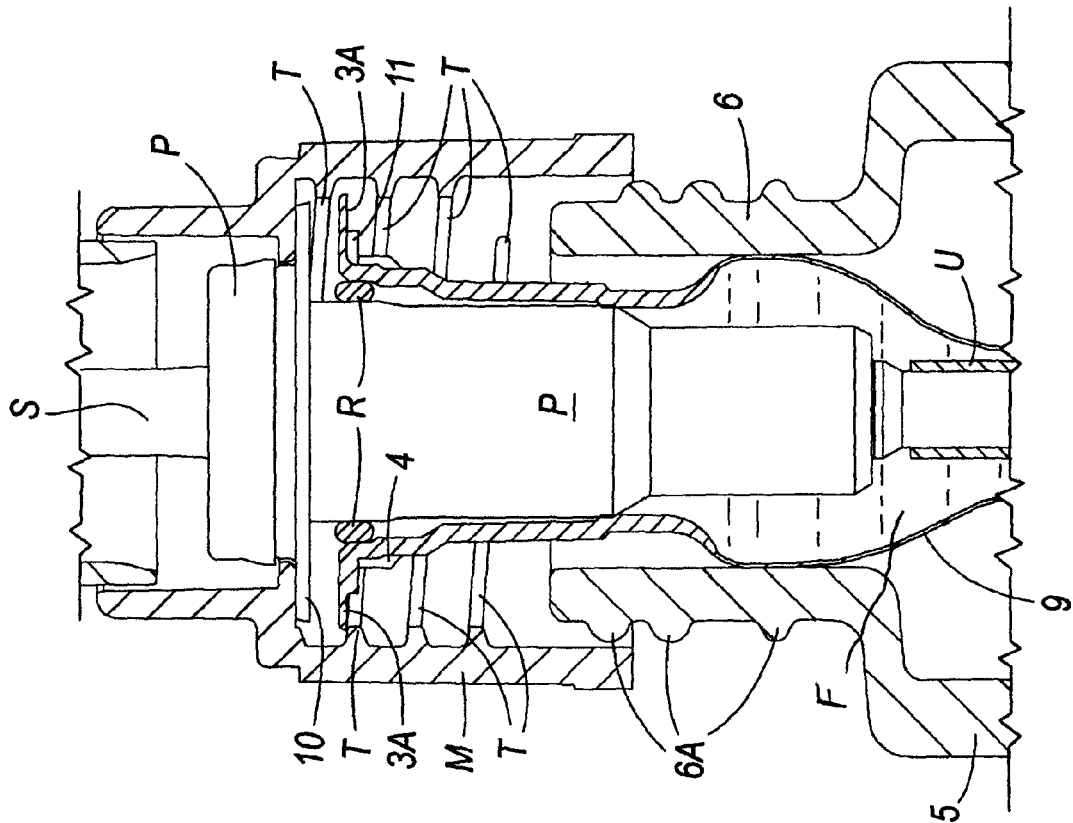
FIG. 10 is similar to FIG. 7, but relates to the device of FIG. 9.

The user receiving the container 5 with the bag 9 already inserted and retained in it (FIG. 4) introduces into the bag (through the aperture in its neck 2) the desired quantity of fluid substance F, which can fill the bag as far as its neck 2, as represented schematically in FIGS. 5, 7 and 10. The said user then inserts into the bag 9, through the aperture in its neck, a manually operable pump P having a dispensing stem S (which projects to the outside of the bag 9 and of the container 5) and a dip tube U which is immersed in the fluid substance contained in the bag.

The pump P is then locked securely onto the neck 6 of the container by a ring cap N having an internal thread which is screwed onto threads or helical ribs 6A projecting from the outside of the container neck 6.

The ring cap N rests on the upper surface of a collar 10 which projects radially from the body of the pump P and presses it into sealed contact with a flange 3 of the neck 2 of the bag 9, hence pressing the lower part of the pump P into the cavity of the bag collar 2 to form a seal, as can be seen from FIGS. 5 to 10, this seal being further improved by an elastic ring R positioned immediately below the collar 10.

It is important to note that the outer edge or maximum diameter of the bag flange 3 is greater than the outer diameter of the container neck 6 on which the flange rests when the device is ready for use.

In the embodiment shown in Figures from 5 to 7 the flange 3 has a continuous peripheral edge (as can be seen from FIG. 2); in this case the ring cap N is formed such that from the most inner surface of the ring cap (see FIGS. 6 and 7 in particular) there projects an annular rib AR (which could consist of a succession of single rib portions) defining a recess or annular groove in which the free edge of the flange 3 projecting from the bag neck is inserted and retained. In this manner, when the ring cap N is unscrewed from the container neck to separate the pump P from the container 5, the bag flange 3 remains coupled to the rib AR (i.e. it remains retained in the groove defined by said rib AR) and the bag 9 (the contents of which have already been dispensed by the pump P, with the result that the bag assumes the squashed form against or towards the dip tube U, as seen in FIG. 7) is automatically extracted from the container (FIG. 7) and can be eliminated or disposed of separately from the container 5, which can be of glass and possibly be reused.

Figure 9:
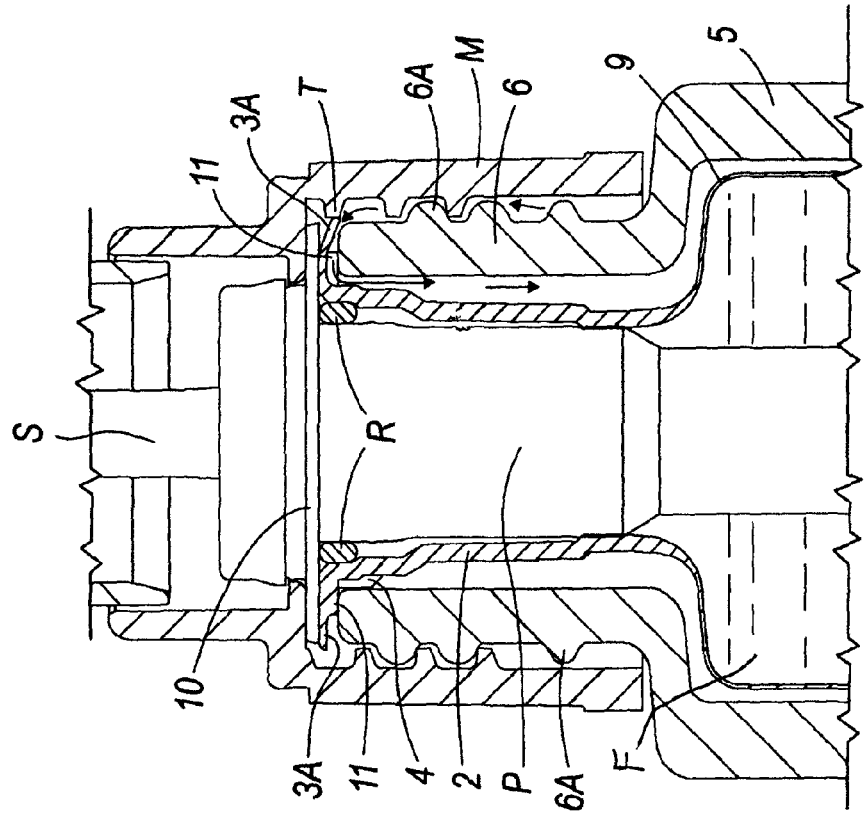
FIG. 9 shows, on an enlarged scale, the end of a different embodiment of the device, the pump being fixed onto the neck of the collar of the rigid container to seal against a flange projecting from the inflated bag obtained using the perform of FIG. 8.

In that embodiment of the device shown in FIGS. 9 and 10, a bag is used, the flange 3A of which is shown in FIG. 8, i.e. it presents its peripheral portions interrupted by several apertures 20 (four apertures in FIG. 8); in this case, the ring cap M (which presents only spiral threads T in its interior and is without the annular rib AR) has its threads passing through the apertures 20 of the flange 3A. During unscrewing, the most inner end portion of the ring cap M, of at least one thread T, rests below the free edge of the flange 3A and drags it (and with it the bag 9) out of the container 5 through its neck 6.

Figure 6:
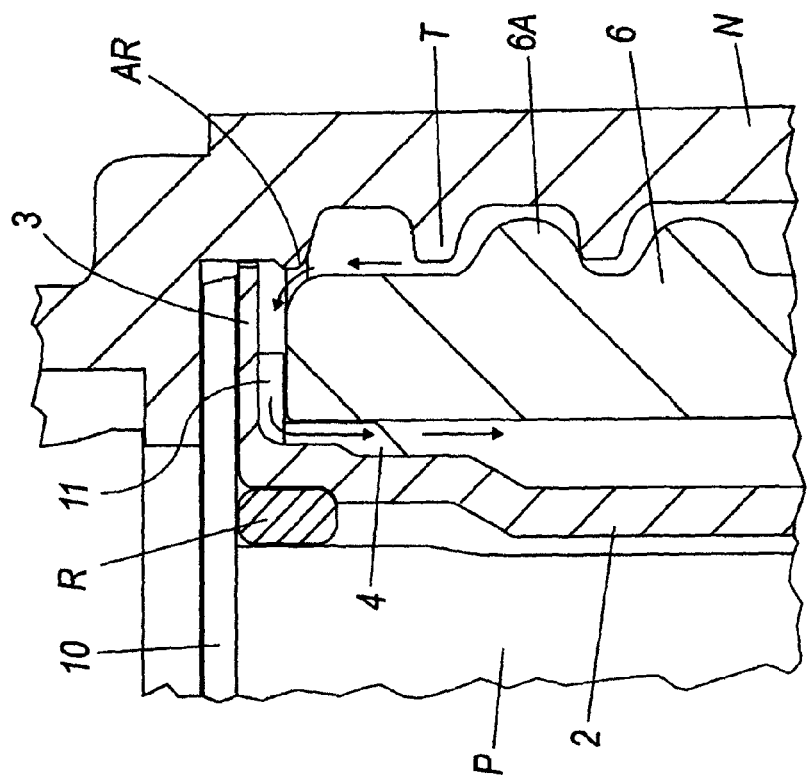
FIG. 6 is an axial section on an enlarged scale showing only a portion of the end of the device of FIG. 5, on which the pump is mounted.

From FIGS. 5, 6 and 9 and in particular from FIGS. 6 and 9 it can be noted that the threads projecting inwards from the ring cap N engage the threads projecting from the container neck, but without sealing against them, hence leaving a free passage enabling the external atmosphere to communicate via the passages defined by the ribs 4 and 11 with the space or interspace between the inner surface of the container 5 and the outer surface of the bag 9 housed therein: the path of the air is shown by a succession of small arrows in FIGS. 6 and 9.

The container can evidently be made of any rigid material (in addition to glass), for example aluminium or other metal: in any event it is not strictly necessary for the air which is to penetrate into the space between the bag and the container, to have to pass or seep between the threads of the ring cap and container neck and then through the passages which have been described with reference to the Figures: this is because one or more air passage holes can be provided in the metal container as illustrated in U.S. Pat. No. 3,420,413 and US 2004/0112921 A1.

It should be noted that the most important characteristic of the device of the invention is the fact that after all the fluid substance has been discharged from the device, the ring cap retaining the pump can be unscrewed and the container be separated from the bag and from the pump, for example to recycle the container separately from the deformable bag.

The invention claimed is:

1. A device for containing fluid substances under airtight conditions and dispensing them, comprising:
   a rigid container having a neck defining an aperture providing access to a container cavity,
   a manually operable pump having a body, a ring cap, and a dip tube,
   a bag made of thermoplastic material housed in the container and itself having a neck from which there radially extends a flange which rests on the free edge of the neck of the container and defines a hole for providing access to the cavity of the bag and for housing the body of the manually operable pump for withdrawing fluid substance from the bag and feeding it to the outside through the pump dispensing stem, the body of the pump being pressed to form a seal on said flange of the bag by the ring cap presenting elements for engaging corresponding elements provided on the neck of the container, passages being provided for air entry from the outside of the container into the space existing between the inner surface of the container and the outer surface of the bag housed therein,
   wherein at least a portion of said bag flange projects radially beyond the outer lateral surface of the neck of the container at least in proximity to the free edge of the neck, from the inner surface of said ring cap there extending at least one profiled element which is positioned beyond the free edge of said bag flange, to retain the flange when the device is in its use position and to rest on that surface of said flange facing the container, to interfere with said flange surface and cause the bag to be extracted from the container together with the pump when the ring cap is disconnected and removed from the container when the bag assumes a squashed form against and towards the pump dip tube after the fluid substance has already been totally dispensed by the pump,
   wherein said passages for air entry from the outside of the container into the space existing between the inner surface of the container and the outer surface of the bag housed therein consist of recesses provided in the outer surface of the bag neck and in the lower surface of the radial edge projecting therefrom, said recesses being bounded by longitudinal ribs projecting from the outer surface of the neck of the bag and respectively by ribs projecting radially from the surface of the bag flange.

2. A device for containing fluid substances under airtight conditions and dispensing them, comprising:

a rigid container having a neck defining an aperture providing access to a container cavity, a manually operable pump having a body, a ring cap, and a dip tube, a bag made of thermoplastic material housed in the container and itself having a neck from which there radially extends a flange which rests on the free edge of the neck of the container and defines a hole for providing access to the cavity of the bag and for housing the body of the manually operable pump for withdrawing fluid substance from the bag and feeding it to the outside through the pump dispensing stem, the body of the pump being pressed to form a seal on said flange of the bag by the ring cap presenting elements for engaging corresponding elements provided on the neck of the container, passages being provided for air entry from the outside of the container into the space existing between the inner surface of the container and the outer surface of the bag housed therein, wherein at least a portion of said bag flange projects radially beyond the outer lateral surface of the neck of the container at least in proximity to the free edge of the neck, from the inner surface of said ring cap there extending at least one profiled element which is positioned beyond the free edge of said bag flange, to retain the flange when the device is in its use position and to rest on that surface of said flange facing the container, to interfere with said flange surface and cause the bag to be extracted from the container together with the pump when the ring cap is disconnected and removed from the container when the bag assumes a squashed form against and towards the pump dip tube after the fluid substance has already been totally dispensed by the pump, wherein the profiled element projecting from the inner surface of said ring cap consists of at least one continuous annular rib or a succession of annular rib segments which define at least one recess or annular groove into which the free edge of the flange projecting from the neck of the bag is inserted and retained, and said passages for air entry from the outside of the container into the space existing between the inner surface of the container and the outer surface of the bag housed therein consist of recesses provided in the outer surface of the bag neck and in the lower surface of the radial edge projecting therefrom, said recesses being bounded by longitudinal ribs projecting from the outer surface of the neck of the bag and respectively by ribs projecting radially from the surface of the bag flange.

3. A device for containing fluid substances under airtight conditions and dispensing them, comprising:

a rigid container having a neck defining an aperture providing access to a container cavity, a manually operable pump having a body, a ring cap, and a dip tube, a bag made of thermoplastic material housed in the container and itself having a neck from which there radially extends a flange which rests on the free edge of the neck of the container and defines a hole for providing access to the cavity of the bag and for housing the body of the manually operable pump for withdrawing fluid substance from the bag and feeding it to the outside through the pump dispensing stem, the body of the pump being pressed to form a seal on said flange of the bag by the ring cap presenting elements for engaging corresponding elements provided on the neck of the container, passages being provided for air entry from the outside of the container into the space existing between the inner surface of the container and the outer surface of the bag housed therein, wherein at least a portion of said bag flange projects radially beyond the outer lateral surface of the neck of the container at least in proximity to the free edge of the neck, from the inner surface of said ring cap there extending at least one profiled element which is positioned beyond the free edge of said bag flange, to retain the flange when the device is in its use position and to rest on that surface of said flange facing the container, to interfere with said flange surface and cause the bag to be extracted from the container together with the pump when the ring cap is disconnected and removed from the container when the bag assumes a squashed form against and towards the pump dip tube after the fluid substance has already been totally dispensed by the pump, wherein the profiled element projecting from the inner surface of said ring cap consists of the inner end of at least one thread or rib engaging a corresponding thread or rib projecting from the neck of the container, this end of the ring cap thread being positioned between said flange and the rigid container, at least a peripheral portion of said flange being interrupted by at least one aperture to enable at least one thread projecting from the ring cap and engaging the corresponding thread projecting from the neck of the container to pass while mounting the ring cap on the container neck, and said passages for air entry from the outside of the container into the space existing between the inner surface of the container and the outer surface of the bag housed therein consist of recesses provided in the outer surface of the bag neck and in the lower surface of the radial edge projecting therefrom, said recesses being bounded by longitudinal ribs projecting from the outer surface of the neck of the bag and respectively by ribs projecting radially from the surface of the bag flange.

\* \* \* \* \*